United States Patent
Junge et al.

(10) Patent No.: US 7,191,827 B2
(45) Date of Patent: Mar. 20, 2007

(54) LOW AMBIENT TEMPERATURE REFRIGERATOR

(75) Inventors: Brent A. Junge, Evansville, IN (US); Allan R. Steinkuhl, Evansville, IN (US); John R. Wisnoski, Haubstadt, IN (US); Ralph Tate, Jr., Evansville, IN (US); Marco Stura, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 489 days.

(21) Appl. No.: 10/744,556

(22) Filed: Dec. 23, 2003

(65) Prior Publication Data

US 2004/0134220 A1  Jul. 15, 2004

Related U.S. Application Data

(60) Provisional application No. 60/436,932, filed on Dec. 30, 2002.

(51) Int. Cl.
*F25B 29/00* (2006.01)

(52) U.S. Cl. ............... 165/263; 165/264; 165/290; 165/291; 62/440; 62/441

(58) Field of Classification Search ............... 165/263, 165/264, 290, 291; 62/440, 441
See application file for complete search history.

(56) References Cited

U.S. PATENT DOCUMENTS 2,488,161 A  *  11/1949  Benson et al. ............ 165/290
2,672,023 A  *  3/1954  Jacobs et al. ............ 165/290
2,724,576 A  *  11/1955  Jacobs ..................... 165/263
3,478,818 A  *  11/1969  Tetsuya et al. ........... 165/264
4,771,532 A  *  9/1988  Taylor et al. ............. 29/455.1
4,834,169 A      5/1989  Tershak et al. ........... 165/30
5,187,941 A      2/1993  Tershak et al. ........... 62/89
6,536,227 B1 *  3/2003  Lee ............................ 62/440

FOREIGN PATENT DOCUMENTS

| | | | |
|---|---|---|---|
| DE | 10259765 A1 | * | 7/2004 |
| JP | 04257684 A | * | 9/1992 |
| JP | 05234666 A | * | 9/1993 |
| JP | 2001043963 A | * | 2/2001 |
| JP | 2002352283 A | * | 12/2002 |
| WO | WO 2005064249 A1 | * | 7/2005 |

* cited by examiner

*Primary Examiner*—John K. Ford
(74) *Attorney, Agent, or Firm*—Robert O. Rice; Stephen Krefman; John F. Colligan

(57) ABSTRACT

A refrigerator adapted for use in low ambient temperature conditions such as in an unheated garage or outdoors on a deck or patio. The refrigerator is provided with a low ambient heater to add heat to the refrigerated space when ambient temperatures outside the refrigerator are low enough that items stored in the refrigerator could freeze. The low ambient heater is controlled by an ambient thermostat located to sense temperatures outside the refrigerator. The low ambient heater and ambient thermostat are connected in the refrigerator control so that the ambient heater can not be energized when the cooling system is operating.

18 Claims, 6 Drawing Sheets

LOW AMBIENT TEMPERATURE REFRIGERATOR

This application claims the benefit of Provisional Application No. 60/436,932, filed Dec. 30, 2002.

BACKGROUND OF THE INVENTION

1. Field of the Invention

The invention relates to a refrigerator for use in low ambient conditions such as can be encountered in an unheated garage or outdoors on a deck or patio. The refrigerator can be provided with an ambient heater to add heat to the refrigerated space when ambient temperatures outside the refrigerator are low enough that items stored in the refrigerator could freeze.

2. Description of the Related Art

Refrigerator-freezers having controls to protect the contents of the refrigerator from freezing when the refrigerator-freezer is operating in low temperature conditions are known.

SUMMARY OF THE INVENTION

In one embodiment of the invention a refrigerator adapted for use in low ambient temperature conditions includes a cabinet having an access opening, a liner positioned in the cabinet having an inside surface defining a refrigerated space, insulation between the liner and the cabinet, a hinged insulated closure mounted to close the access opening of the cabinet in a closed position and to permit access to the inside of the refrigerator in an open position, a cooling system for cooling the inside of the refrigerator including a cooling thermostat for sensing the temperature in the refrigerated space to energize the cooling system when the temperature inside the refrigerator rises above a selected temperature, an ambient heater for heating the refrigerated space, and an ambient thermostat connected in an electrical circuit with the ambient heater and positioned to sense air temperature outside the refrigerator. The ambient thermostat is connected to energize the ambient heater when the temperature outside the refrigerator is below a predetermined temperature.

In another embodiment of the invention a refrigerator adapted for use in a garage or outdoors where it can be subject to low ambient temperature conditions includes a cabinet having a top wall, a pair of sidewalls, a rear wall and a bottom wall defining a front opening, a plastic liner positioned inside the cabinet having a top wall, a pair of sidewalls, a rear wall and a bottom wall defining a refrigerated space and an outside surface, foamed in place insulation between the outside surface of the liner and the inside surface of the cabinet, a hinged insulated door mounted to close the front opening of the cabinet in a closed position and to permit access to the inside of the refrigerator in an open position, a cooling system for cooling the inside of the refrigerator including a cooling thermostat for sensing the temperature in the refrigerated space to energize the cooling system when the temperature in the refrigerated space rises above a selected refrigerated space temperature, an ambient heater for heating the refrigerated space comprising a first heater element mounted on one liner sidewall and a second heater element mounted on the other liner sidewall, and an ambient thermostat connected in electrical circuit with the ambient heater and positioned to sense the air temperature outside the refrigerator. The ambient thermostat is connected to energize the ambient heater when the temperature outside the refrigerator is below a first predetermined temperature.

In another embodiment of the invention a refrigerator adapted for use in a garage or outdoors where in can be subject to low ambient temperature conditions includes a cabinet having a top wall, a pair of sidewalls, a rear wall and a bottom wall defining a front opening and a machinery compartment, a plastic liner positioned inside the cabinet having a top wall, a pair of sidewalls, a rear wall and a bottom wall defining a refrigerated space and an outside surface, foamed in place insulation between the outside surface of the liner and the inside surface of the cabinet, a hinged insulated door mounted to close the front opening of the cabinet in a closed position and to permit access to the inside of the refrigerator in an open position, a cooling system for cooling the inside of the refrigerator including a compressor, an evaporator, and a condenser connected in a cooling circuit, an adjustable cooling thermostat for sensing the temperature in the refrigerated space to energize the compressor for cooling the refrigerated space when the temperature inside the refrigerator rises above a selected refrigerated space temperature, an ambient heater for heating the refrigerated space comprising a first heater element mounted on one liner sidewall and a second heater element mounted on the other liner sidewall, a heater thermostat for sensing the temperature in the refrigerated space and connected in circuit with the ambient heater to de-energize the ambient heater when the temperature in the refrigerated space rises above a predetermined refrigerated space temperature, and an ambient thermostat positioned to sense the air temperature outside the refrigerator and connected to the cooling thermostat and the heater thermostat. The ambient thermostat energizes the ambient heater through the heater thermostat when the temperature outside the refrigerator falls below a first predetermined temperature, and wherein the ambient thermostat energizes the cooling thermostat when the temperature outside the refrigerator rises above a second predetermined temperature.

DESCRIPTION OF THE INVENTION

In accordance with the present invention a refrigerator can be adapted for use in low ambient temperature conditions. Applications for a low ambient temperature refrigerator can include use in unheated locations such as a garage or outdoors on a patio or deck. In many locales ambient temperatures in an unheated garage or outdoors on a patio or deck can fall below freezing so that fresh food or liquid material stored in a refrigerator in such locations could be subject to unintended freezing. Co-pending patent applications Ser. Nos. 10/334,078 and 10/462,461 disclose use of a modular low ambient temperature refrigerator as a component of a modular workbench system, which patent applications are incorporated by reference.

Figure 1:
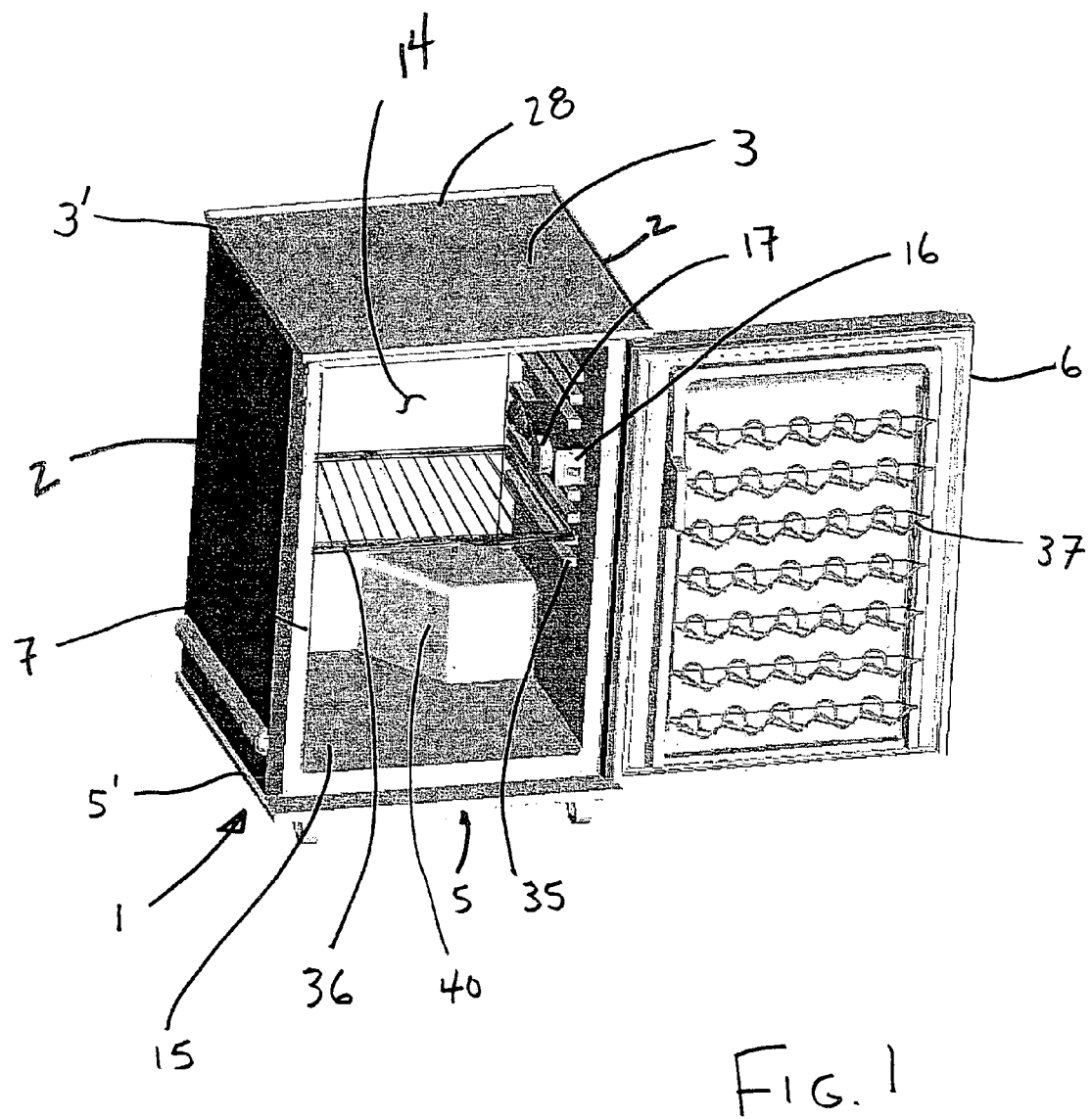
FIG. 1 is a front perspective view of a low ambient temperature refrigerator with the door open showing internal components of the low ambient temperature refrigerator.
Figure 2:
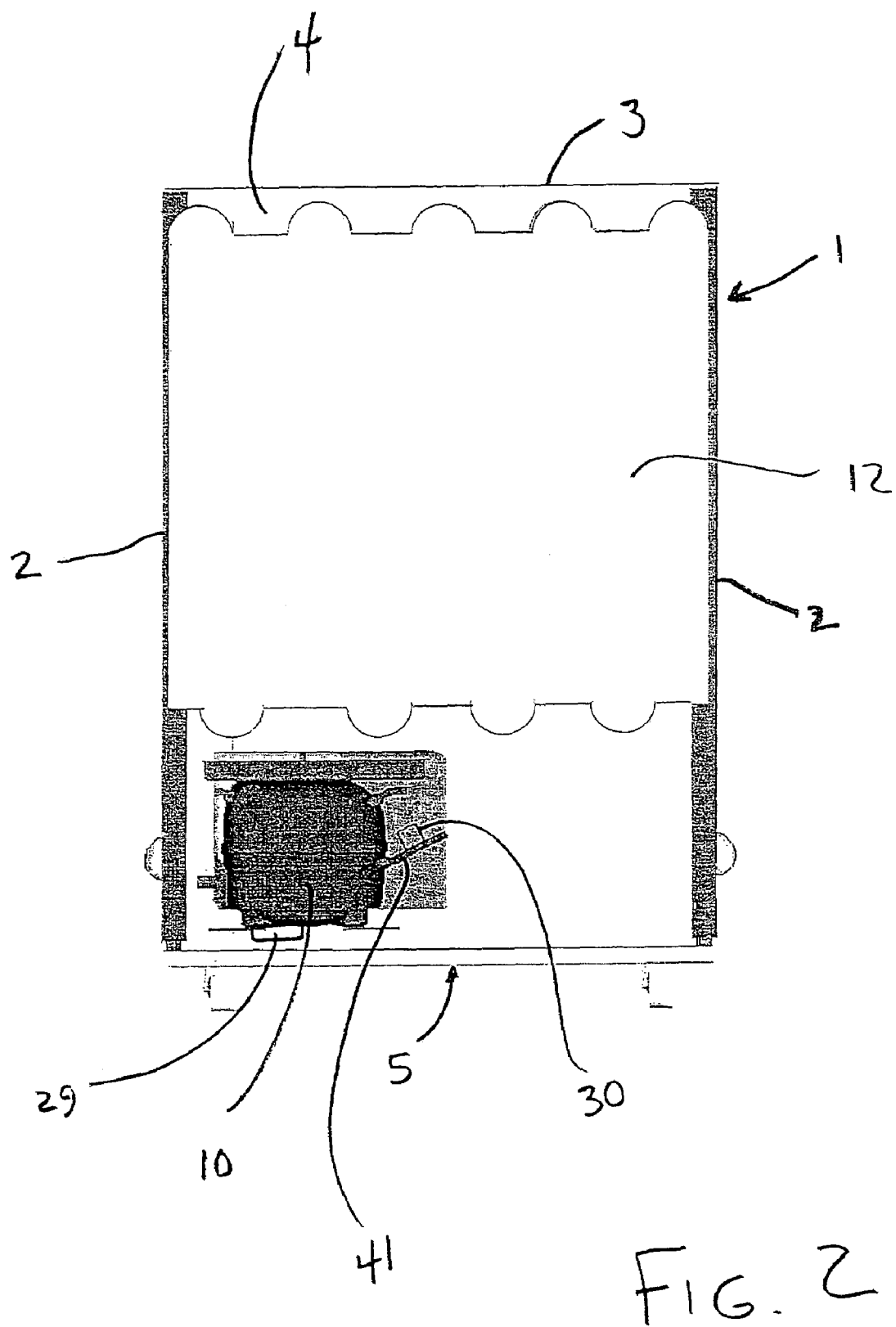
FIG. 2 is a rear elevational view of the low ambient temperature refrigerator of FIG. 1 showing the rear of the refrigerator and components in the machinery compartment.

Referring to FIG. 1 and FIG. 2, refrigerator 1 can be a modular refrigerator having a cabinet with a pair of sidewalls 2, a top 3, a bottom wall 5 and a door 6. Top 3 and bottom 5 can include a top tray 3' and a bottom tray 5' that extend beyond the rear wall of the cabinet to form a protected space for a static condenser 12 mounted to the rear wall. Top tray 3' can be provided with a top vent 28 to facilitate air flow over static condenser 12 in operation. Door 6 can be insulated and can be hinged to the cabinet as is well known to those skilled in the art. Refrigerator 1 can be provided with a plastic liner 7. The space between liner 7 and the cabinet can be provided with insulation, not shown. Such insulation can be foamed in place polyurethane insulation or other insulation material as is well known to those skilled in the art. The liner 7 together with door 6 defines a refrigerated space 14. Liner 7 can be provided with horizontal tracks 35 arranged to provide support for one or more shelves 36. Tracks 35 can be arranged in one or more sets of tracks in order to allow the user to adjust the height of the one or more shelves 36. Door 6 is shown with an inner door panel carrying a beverage container rack 37. Those skilled in the art will recognize that an inner door panel having one or more shelves or a plain flat inner door can be provided instead of an inner door panel having a rack for beverage containers. Likewise, shelves 36 can be replaced with baskets or drawers as is well known to those skilled in the art.

Figure 3:
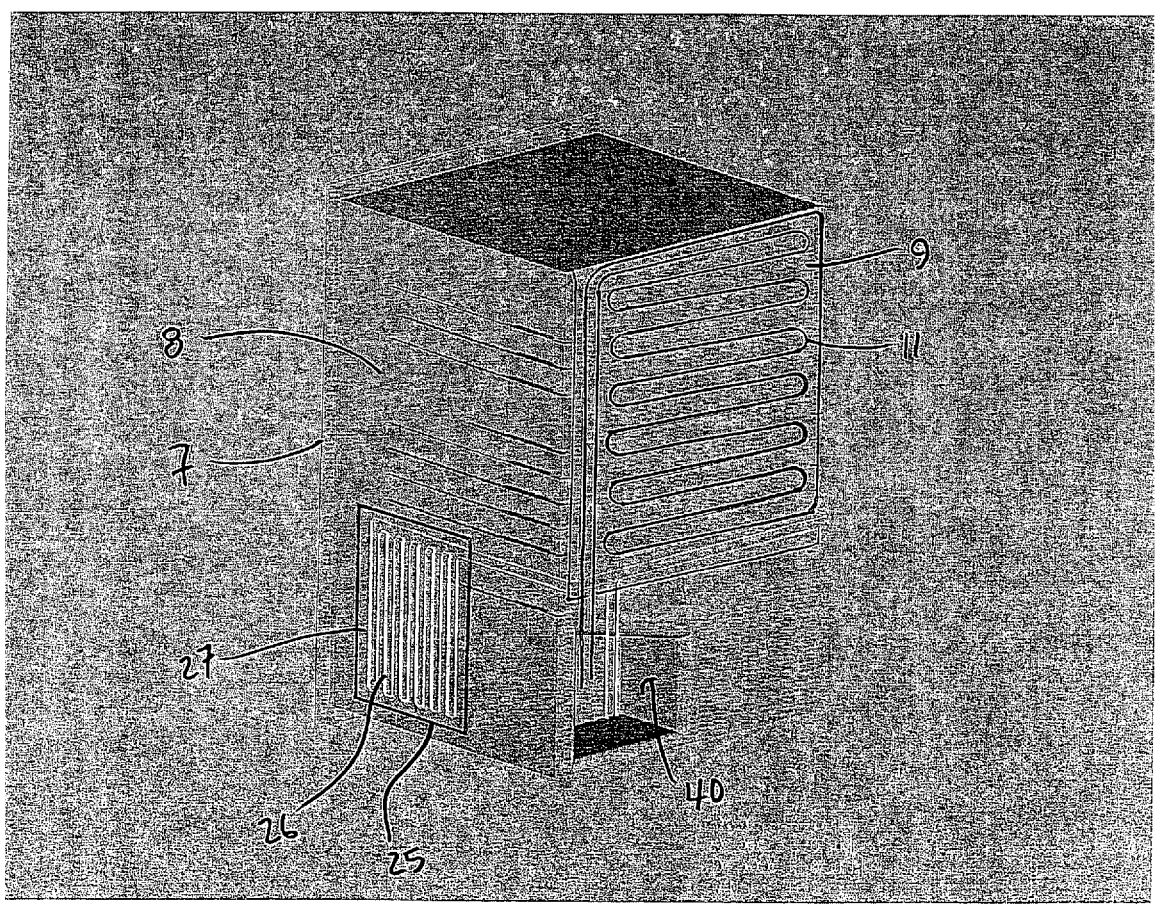
FIG. 3 is a rear perspective view of the liner for the low ambient temperature refrigerator of FIG. 1 prior to assembly and application of insulation showing an ambient heater element on a sidewall and the evaporator on the rear wall of the liner.

Referring to FIG. 2 and FIG. 3, refrigerator 1 can be provided with a cooling system including a compressor 10, an evaporator 11, a condenser 12 connected in a cooling circuit and can be controlled by a cooling thermostat 13 as is well known to those skilled in the art. The evaporator 11 can be a serpentine coil attached to the rear wall 9 of the liner 7 as is well known to those skilled in the art. Condenser 12 can be a static condenser mounted on the rear wall of refrigerator 1. Alternately, condenser 12 can be a forced air condenser mounted in a machinery compartment 40 beneath bottom wall 5. Compressor 10 can be located in machinery compartment 40 accessible from the rear of refrigerator 1. Compressor 10 can include a compressor motor 42. Compressor 10 can be connected to evaporator 11 by a suction line, not shown. Compressor 10 can be connected to condenser 12 through a discharge tube 41. Condenser 12 can be connected to evaporator 11 by a refrigerant line that can include an expansion device, not shown, as is well known to those skilled in the art. Instead of a compressor, condenser, evaporator circuit cooling system, other cooling systems such as a thermoelectric cooling system or other known cooling systems can be used as is well known to those skilled in the art.

Figure 4:
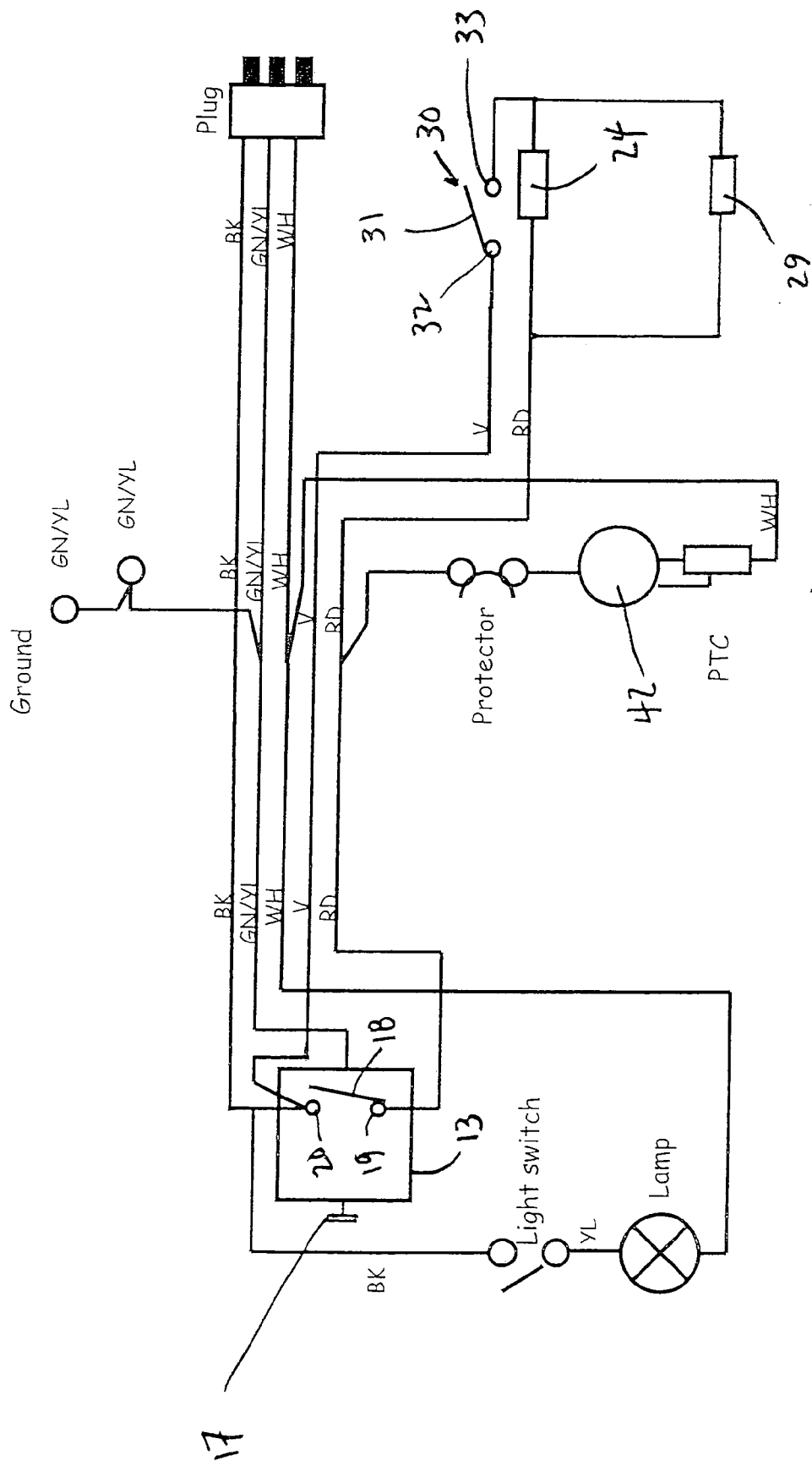
FIG. 4 is a circuit diagram for the low ambient temperature refrigerator of FIG. 1 showing connection of the ambient heater and ambient thermostat in the refrigerator control circuit.

Referring to FIG. 3 and FIG. 4, an ambient heater 24 can be arranged to provide heat to the refrigerated space 14 in the event the ambient temperature around refrigerator 1 is near or below freezing raising the possibility that temperatures in the refrigerated space 14 might fall below freezing. Ambient heater 24 can take the form of a pair of foil heaters 25, one located on each liner side wall 8 adjacent bottom wall 15. Each foil heater 25 can comprise a serpentine heater wire 26 mounted on an aluminum foil sheet 27. Foil sheet 27 can have adhesive on one side to hold the serpentine heater wire 26 in place and to hold each foil heater 25 in place on a sidewall 8. The foil heaters 25 can be positioned between the outside surface of the liner walls 8 and the insulation in the space between the liner and cabinet. In one embodiment each foil heater 25 can be rated at 20 watts to provide a 40 watt ambient heater 24. While foil heaters 25 are shown positioned on the outside of liner sidewalls 8 in FIG. 3, those skilled in the art will understand that ambient heater 24 can be a suitable heater or heaters positioned inside liner 7 instead of foil heaters 25 on the outside surface of the liner sidewalls 8.

The ambient heater 24 can be connected in an electrical circuit with an ambient thermostat 30 to energize the ambient heater 24 when temperature outside the refrigerator 1 falls to a first predetermined temperature. In one embodiment ambient thermostat 30 can be mounted on discharge tube 41 located in the machinery compartment 40. Accordingly, ambient thermostat 30 can be exposed to ambient conditions around refrigerator 1. In the embodiment of FIG. 4, ambient thermostat 30 includes a pair of thermostat contacts 32 and 33. Ambient thermostat 30 can include a bi-metal thermostat arm 31 set to close thermostat contacts 32 and 33 when the ambient thermostat 30 senses an ambient temperature of approximately 40° F. Ambient thermostat 30 can be set to open thermostat contacts 32 and 33 at a second, higher predetermined temperature of approximately 80° F. assuring that ambient thermostat can not energize the ambient heater 24 too soon after the cooling system has been operating. The temperature of the discharge tube 41 is elevated during operation of the cooling system due to the presence of compressed refrigerant. After the compressor 10 is de-energized the temperature of discharge tube 41 will cool and, over time, approach ambient temperature.

As those skilled in the art will understand, it can be easier for a compressor to start in ambient temperatures below freezing, especially in ambient temperatures in the range of 0° F. and colder, if heat is supplied to the compressor prior to attempting to start the compressor. Cold starting and running can also be detrimental to compressor life. Accordingly, compressor 10 can be provided with a crankcase heater 29 to facilitate starting compressor 10 under cold ambient conditions. Crankcase heater 29 can be a heater wrapped around the base of compressor 10, or can take other forms as is well known to those skilled in the art. Crankcase heater 29 can be connected in the control circuit in parallel with ambient heater 24 in order to be energized only when ambient heater 24 is energized. Crankcase heater 29 can also be provided with a separate thermostat, not shown, located in the machinery compartment to limit operation of the crankcase heater 29 to ambient temperatures at which provision of heat to compressor 10 is desirable to facilitate starting of compressor 10. Crankcase heater 29 could also be connected in circuit with a crankcase heater thermostat, not shown, and not in circuit with ambient heater 24 to operate independent of ambient heater 24 under control of the crankcase heater thermostat as will be understood by those skilled in the art. Crankcase heater 29 can be a fixed watt heater, or if desired, could be a variable watt heater regulated by a temperature sensing device as is well known to those skilled in the art.

In the event an alternate cooling system is utilized instead of a compressor, condenser, evaporator circuit as shown in FIG. 2-FIG. 4, ambient thermostat 30 can be located in a suitable location to be exposed to ambient conditions outside refrigerator 1. Ambient thermostat 30 can be set to respond to an ambient temperature higher or lower than approximately 40° F. as disclosed in the embodiment of FIG. 4. The set point of the ambient thermostat depends on the location of the ambient thermostat, the design of the refrigerator and the cooling system. The ambient thermostat should be set to sense ambient temperature conditions that could lead to below freezing conditions in refrigerated space 14 if heat is not added to the refrigerated space such as by energizing ambient heater 24.

Referring again to FIG. 1 and FIG. 4, refrigerator 1 can be provided with a thermostat 13 mounted in control box 16 and having a control knob 17. Control knob 17 can allow the user to select the temperature at which thermostat 13 closes as is well known to those skilled in the art. Thermostat 13 can include a movable thermostat arm 18 and a pair of thermostat contacts 19 and 20. When movable thermostat arm 18 connects thermostat contacts 19 and 20 in response to sensing the selected temperature in refrigerated space 14, compressor motor 42 can be connected to line voltage to operate the cooling system as is well known to those skilled in the art.

Referring to FIG. 4, the circuit of ambient heater 24, crankcase heater 29 and ambient thermostat 30 can be connected in parallel with cooling thermostat contacts 19 and 20. When cooling thermostat 13 calls for cooling the refrigerated space 14, movable thermostat arm 18 can connect thermostat contacts 19 and 20 energizing compressor motor 42. When movable thermostat arm 18 connects thermostat contacts 19 and 20 the ambient heater 24, crankcase heater 29 and ambient thermostat 30 are shorted to prevent energization of ambient heater 24 to add heat to refrigerated space 14, and prevent energization of crankcase heater 29 to add heat to compressor 10. Thus, when the cooling system is operating to provide cooling to refrigerated space 14, the ambient heater 24 and crankcase heater 29 are de-energized regardless of the ambient temperature sensed by ambient thermostat 30.

In operation when the ambient temperature around refrigerator 1 cools to approximately 40° F. bi-metal ambient thermostat arm 31 flexes to connect thermostat contacts 32 and 33. Provided cooling thermostat contacts 19 and 20 are not closed, ambient heater 24 and crankcase heater 29 are connected through compressor motor 42 to line voltage at cooling thermostat contact 20. While ambient heater 24 and crankcase heater 29 are energized, heat is provided to refrigerated space 14 to prevent items stored in refrigerated space 14 from freezing, and heat is provided to compressor 10 to facilitate starting of compressor 10 when additional cooling is subsequently called for by thermostat 13. Ambient heater 24 and crankcase heater 29 continue to operate adding heat to the refrigerated space 14 and compressor 10 respectively until cooling thermostat 13 closes thermostat contacts 19 and 20. When thermostat contacts 19 and 20 close ambient heater 24, crankcase heater 29 and ambient thermostat 30 are shorted de-energizing ambient heater 24 and crankcase heater 29. Closing of thermostat contacts 19 and 20 also energizes the cooling system by energizing compressor motor 42. Operation of compressor 10 causes compressed refrigerant to circulate through discharge tube 41 causing the temperature of the discharge tube to rise, typically above 80° F. thus causing ambient thermostat to open as discussed above. After sufficient cooling system operation to reduce the temperature in the refrigerated space 14, cooling thermostat 13 opens thermostat contacts 19 and 20 de-energizing compressor motor 42. Discharge tube 41 will cool over time after compressor 10 stops after the cooling thermostat 13 is satisfied depending on the ambient temperature around the refrigerator. After discharge tube 41 has cooled to less than 80° F., ambient thermostat 30 can once again close thermostat contacts 32 and 33 upon sensing temperatures of approximately 40° F. once again energizing ambient heater 24. While operation of modular refrigerator 1 has been described with a crankcase heater, those skilled in the art will understand that there can be other solutions to difficulty of starting a compressor under low ambient temperature conditions. Accordingly, those skilled in the art will understand that refrigerator 1 can be supplied without a crankcase heater 29 if desired.

Figure 5:
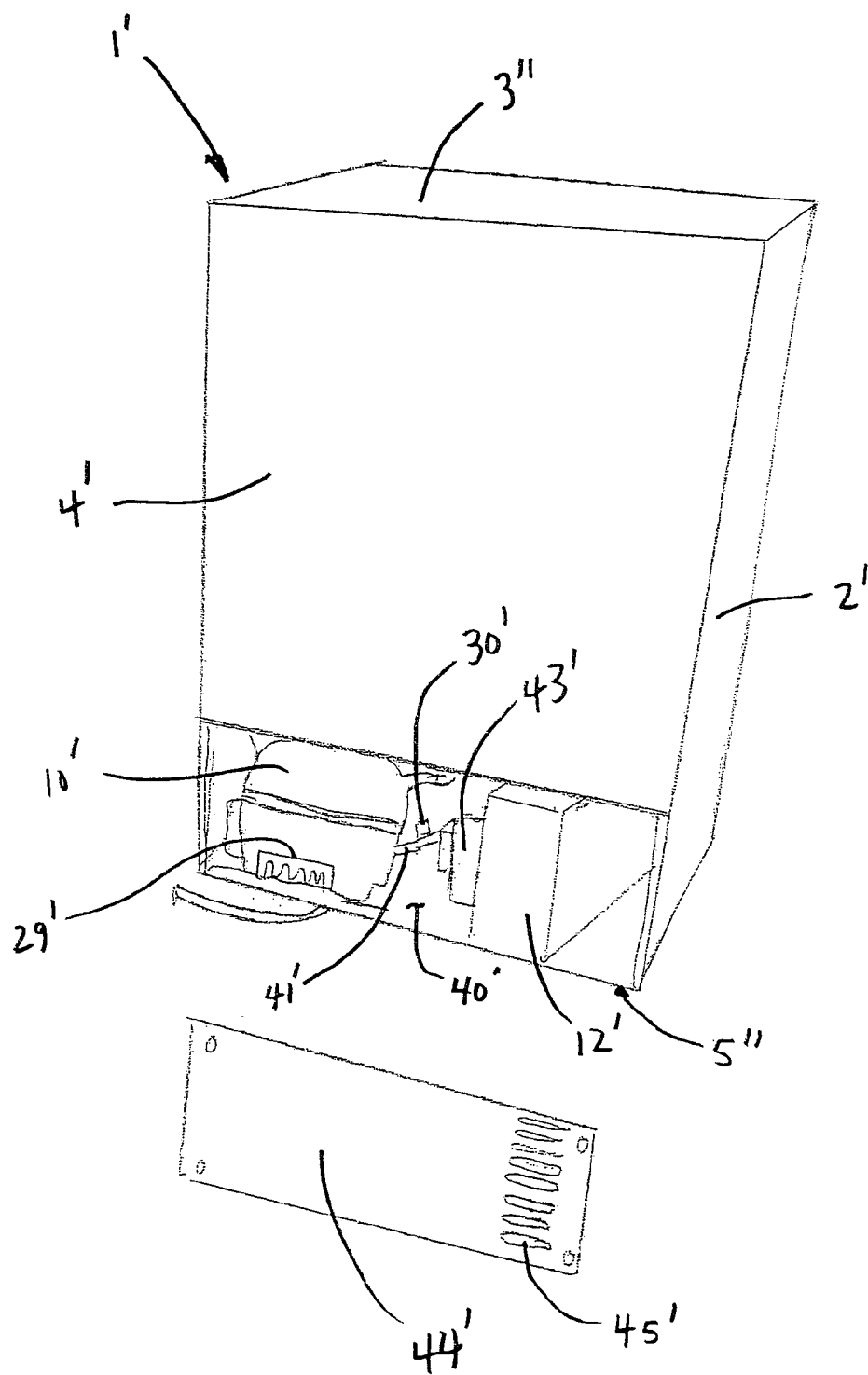
FIG. 5 is a rear elevational view of an alternate embodiment of a low ambient temperature refrigerator having a forced air condenser.

Referring to FIG. 5, an alternate embodiment refrigerator 1' having a pair of side walls 2', a top wall 3", a rear wall 4', a bottom wall 5" and a machinery compartment 40' is shown. In this embodiment, a condenser 12' is located in the machinery compartment 40' and is provided with a condenser fan 43'. In this embodiment a cover 44', can be provided to close the rear of the machinery compartment 40'. Cover 44' can have a plurality of louvers 45' for air flow over condenser 12' by condenser fan 43' as is well known to those skilled in the art. The refrigerator 1' of this embodiment operates generally in the same as refrigerator 1 in the embodiment shown in FIG. 1–FIG. 4 with the exception of the inclusion of a forced air condenser, and condenser fan 43' connected in series with the compressor motor 42' as will be readily understood by those skilled in the art. The liner 7' of refrigerator 1' can be provided with an ambient heater 24' that can include a pair of foil heaters 25' mounted on the side walls 8' of liner 7'. Compressor 1' can be provided with a crankcase heater 29'. In the event a crankcase heater 29' is provided, the operation can be the same as in the embodiment of FIG. 1–FIG. 4. Refrigerator 1' can be provided with a control circuit like that disclosed in FIG. 4 with the addition of a condenser fan motor, not shown, connected in series with the compressor motor 42' to operate with compressor motor 42'.

Figure 6:
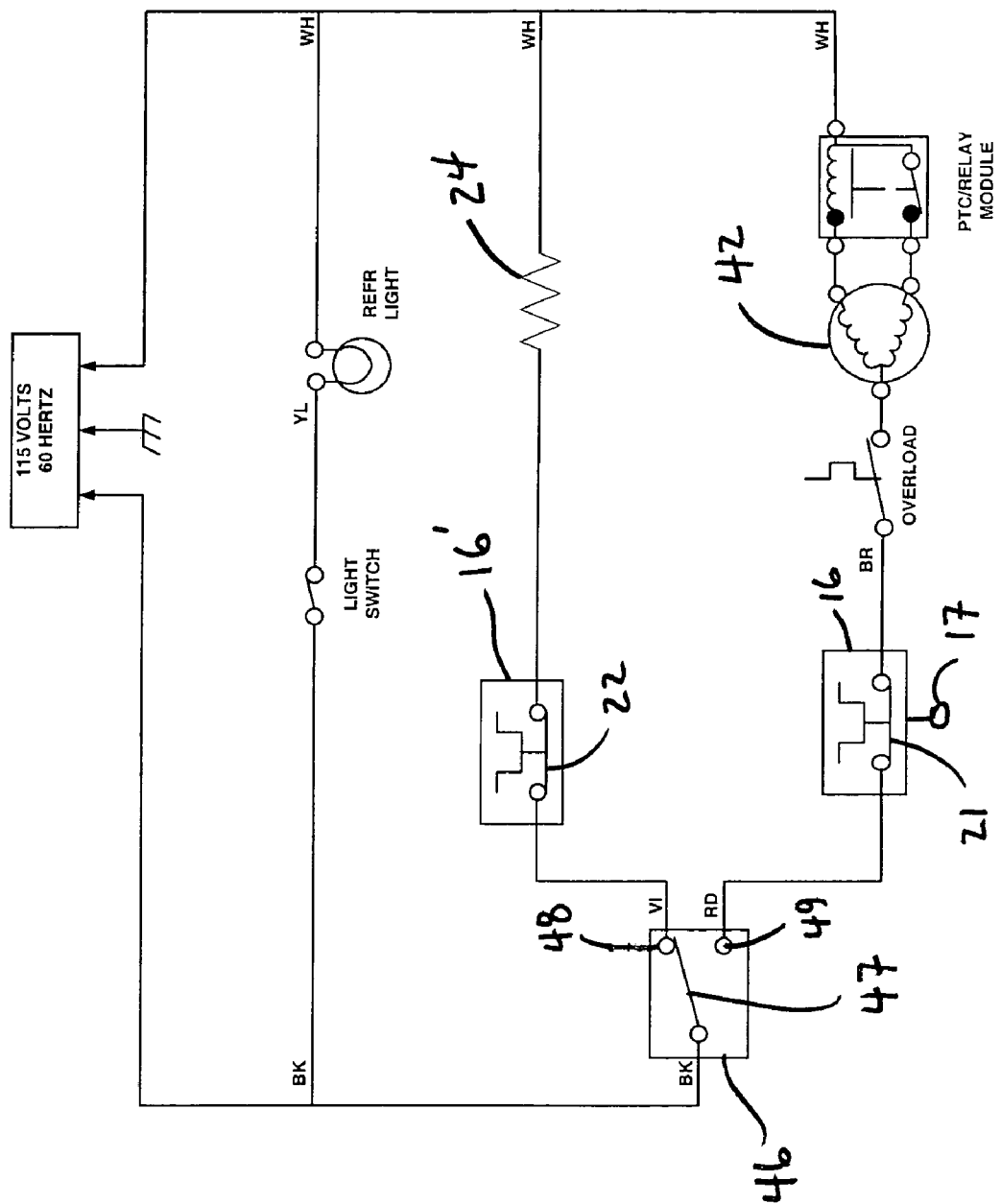
FIG. 6 is a circuit diagram of an alternate embodiment of a low ambient temperature refrigerator of FIG. 1 showing connection of the ambient heater and an alternate ambient thermostat in the refrigerator control circuit.

Referring to FIG. 6, an alternate control circuit for the ambient heater 24 can be seen. The ambient heater 24 can be connected in an electrical circuit with an ambient thermostat 46 to energize the ambient heater 24 when temperature outside the refrigerator 1 falls to a predetermined temperature. In the embodiment of FIG. 6, ambient thermostat 46 can be a 3-way bi-metal thermostat and can be located in the machinery compartment 40 (ambient thermostat 46 is not shown in FIG. 2, FIG. 3 or FIG. 5). Accordingly, ambient thermostat 46 can be exposed to ambient conditions around refrigerator 1. In the embodiment of FIG. 6, ambient thermostat 46 can include two contacts 48 and 49. Ambient thermostat 46 can include a bi-metal thermostat arm 47 set to switch from thermostat contact 49 to thermostat contact 48 when the ambient thermostat 46 senses a first predetermined ambient temperature. In the embodiment of FIG. 6, ambient thermostat 46 can be set to transfer from thermostat contact 49 to thermostat contact 48 when ambient temperatures fall to 32°±5° F. Thermostat arm 47 can be selected to transfer from thermostat contact 48 to thermostat contact 49 when the ambient temperature rises to a second, higher, predetermined temperature. In the embodiment of FIG. 6, thermostat arm 47 can be set to transfer from thermostat contact 48 to thermostat contact 49 when the ambient temperature rises to 48°±6° F. Ambient heater 24 is connected to line voltage through non-adjustable thermostat 22 and ambient thermostat 46. Non-adjustable thermostat 22 can be located in the refrigerated space 14 in a control box 16', not shown, that can be located in the vicinity of control box 16. Non-adjustable thermostat 22 can be selected to open at a predetermined refrigerated space temperature to prevent the ambient heater from raising temperatures in the refrigerated compartment too high. In the embodiment of FIG. 6, non-adjustable thermostat 22 can be selected to open when the temperature in the refrigerated space 14 rises above 45°±3° F. Adjustable thermostat 21 can be located in control box 16 in the refrigerated space 14, and can be provided with a control knob 17 to allow the user to adjust the temperature for the refrigerated space as described above.

Still referring to the embodiment of FIG. 6, in operation when the ambient temperature around refrigerator 1 cools to approximately 32° F., thermostat arm 47 flexes to transfer from thermostat contact 49 to thermostat contact 48. Transfer of thermostat arm 47 from thermostat contact 49 disconnects compressor motor 42 from line voltage and connects ambient heater 24 to line voltage through non-adjustable thermostat 22. Thus, until ambient temperatures rise to the second predetermined ambient temperature, ambient heater 24 will be energized through non-adjustable thermostat 22 to provide heat to the refrigerated space to assure that the contents of the refrigerated space 14 do not freeze unless the temperature in the refrigerated space rises above the predetermined refrigerated space temperature and heater thermostat 22 opens. Transfer of thermostat arm 47 from thermostat contact 48 to thermostat contact 49 de-energizes ambient heater and connects compressor motor 42 to line voltage through adjustable thermostat 21. Thus, when ambient thermostat 46 senses ambient temperatures above the second predetermined ambient temperature, compressor 10 can operate to cool the refrigerated space 14 under control of adjustable thermostat 21. While operation of modular refrigerator 1 has been described without a crankcase heater in the embodiment shown in FIG. 6, those skilled in the art will understand that a crankcase heater or other known solutions to the difficulty of starting a compressor under low ambient temperature conditions can be provided. Those skilled in the art will understand that the alternate control circuit embodiment of FIG. 6 can be applied to the refrigerator embodiment of FIG. 5 as discussed above in connection with FIG. 4. Likewise, those skilled in the art will understand that the first and second predetermined ambient temperatures at which the ambient thermostat 46 operates and the predetermined refrigerated space temperature at which non-adjustable thermostat 22 operates can be higher or lower depending on the construction of the refrigerator 1, and the design of the refrigeration system. Further, those skilled in the art will recognize that a crankcase heater can be used in connection with the embodiment of FIG. 6 as discussed above in connection with the embodiment of FIG. 4.

While the invention has been specifically described in connection with certain specific embodiments thereof, it is to be understood that this is by way of illustration and not of limitation, and the scope of the appended claims should be construed as broadly as the prior art will permit.

We claim:

1. A refrigerator adapted for use in low ambient temperature conditions comprising:
    a cabinet having an access opening;
    a liner positioned in the cabinet having an inside surface defining a refrigerated space;
    insulation between the liner and the cabinet;
    a hinged insulated closure mounted to close the access opening of the cabinet in a closed position and to permit access to the inside of the refrigerator in an open position;
    a cooling system for cooling the inside of the refrigerator including a cooling thermostat for sensing the temperature in the refrigerated space to energize the cooling system when the temperature inside the refrigerator rises above a selected temperature;
    an ambient heater for heating the refrigerated space;
    an ambient thermostat connected in an electrical circuit with the ambient heater and positioned to sense air temperature outside the refrigerator, wherein the ambient thermostat is connected to energize the ambient heater when the temperature outside the refrigerator is below a first predetermined temperature; and
    further including a heater thermostat positioned inside the refrigerator and connected in a circuit with the ambient thermostat and the ambient heater, and wherein the ambient thermostat is arranged to connect the ambient heater and heater thermostat to a power supply when the temperature outside the refrigerator falls below the first predetermined temperature, and connects the cooling thermostat to the power supply when the temperature outside the refrigerator rises above a second predetermined temperature, whereby the ambient heater is energized through the heater thermostat when temperatures outside the refrigerator fall below the first predetermined temperature and the cooling system is energized through the cooling thermostat when temperatures outside the refrigerator rise above the second predetermined temperature.

2. The refrigerator of claim 1 wherein the heater thermostat opens to de-energize the ambient heater when temperatures inside the refrigerator rise above a predetermined refrigerated space temperature.

3. The refrigerator of claim 1 wherein the cooling system includes a compressor, an evaporator and a condenser connected in a cooling circuit, and the ambient thermostat is a bi-metal thermostat and is mounted to a discharge tube leading from the compressor to the condenser.

4. The refrigerator of claim 1 wherein the liner includes a pair of sidewalls and the ambient heater is mounted to at least one sidewall of the liner.

5. The refrigerator of claim 4 wherein the ambient heater comprises a pair of heater elements with one heater element attached to each of the sidewalls.

6. The refrigerator of claim 5 wherein the ambient heater elements comprise a serpentine heater wire mounted to a foil sheet mounted on the outside surface of the liner sidewalls adjacent the bottom of the liner.

7. The refrigerator of claim 4 wherein the liner is a plastic liner and the evaporator is a serpentine evaporator mounted to the outside surface of the liner.

8. The refrigerator of claim 7 wherein the serpentine evaporator is mounted to the outside rear surface of the liner and the ambient heater comprises a pair of heater elements with one heater element attached to each of the liner sidewalls.

9. The refrigerator of claim 8 wherein the ambient heater elements comprise a serpentine heater wire mounted to a foil sheet mounted on the outside surface of the liner sidewalls adjacent the bottom of the liner.

10. A refrigerator adapted for use in a garage or outdoors where it can be subject to low ambient temperature conditions comprising:
    a cabinet having a top wall, a pair of sidewalls, a rear wall and a bottom wall defining a front opening;
    a plastic liner positioned inside the cabinet having a top wall, a pair of sidewalls, a rear wall and a bottom wall defining a refrigerated space and an outside surface;
    foamed in place insulation between the outside surface of the liner and the inside surface of the cabinet;

a hinged insulated door mounted to close the front opening of the cabinet in a closed position and to permit access to the inside of the refrigerator in an open position:

a cooling system for cooling the inside of the refrigerator including a cooling thermostat for sensing the temperature in the refrigerated space to energize the cooling system when the temperature in the refrigerated space rises above a selected refrigerated space temperature:

an ambient heater for heating the refrigerated space comprising a first heater element mounted on one liner sidewall and a second heater element mounted on the other liner sidewall;

an ambient thermostat connected in an electrical circuit with the ambient heater and positioned to sense the air temperature outside the refrigerator, wherein the ambient thermostat is connected to energize the ambient heater when the temperature outside the refrigerator is below a first predetermined temperature; and further including a heater thermostat positioned inside the refrigerator and connected in a circuit with the ambient thermostat and the ambient heater, and wherein the ambient thermostat is arranged to connect the ambient heater and heater thermostat to a power supply when the temperature outside the refrigerator falls below a first predetermined temperature, and connects the cooling thermostat to the power supply when the temperature outside the refrigerator rises above a second predetermined temperature, whereby the ambient heater is energized through the heater thermostat when temperatures outside the refrigerator fall to the first predetermined temperature and the cooling system is energized through the cooling thermostat when temperatures outside the refrigerator rise above the second predetermined temperature.

11. The refrigerator of claim 10 wherein the heater thermostat opens to de-energize the ambient heater when temperatures inside the refrigerator rise above a predetermined refrigerated space temperature.

12. The refrigerator of claim 10 wherein the ambient heater elements comprise a serpentine heater wire mounted to a foil sheet mounted on the outside surface of the liner sidewalls adjacent the bottom of the liner.

13. The refrigerator of claim 10 wherein the cooling system includes a compressor, an evaporator and a condenser connected in a cooling circuit, and wherein the compressor is provided with a crankcase heater connected in circuit with the ambient hearer for operation with the ambient heater, and the ambient thermostat is a bi-metal thermostat and is mounted to a discharge tube leading from the compressor to the condenser.

14. A refrigerator adapted for use in a garage or outdoors where it can be subject to low ambient temperature conditions comprising:

a cabinet having a top wall, a pair of sidewalls, a rear wall and a bottom wall defining a front opening and a machinery compartment;

a plastic liner positioned inside the cabinet having a top wall, a pair of sidewalls, a rear wall and a bottom wall defining a refrigerated space and an outside surface;

foamed in place insulation between the outside surface of the liner and the inside surface of the cabinet;

a hinged insulated door mounted to close the front opening of the cabinet in a closed position and to permit access to the inside of the refrigerator in an open position;

a cooling system for cooling the inside of the refrigerator including a compressor, an evaporator, and a condenser connected in a cooling circuit;

an adjustable cooling thermostat for sensing the temperature in the refrigerated space to energize the compressor for cooling the refrigerated space when the temperature inside the refrigerator rises above a selected refrigerated space temperature;

an ambient heater for hearing the refrigerated space comprising a first heater element mounted on one liner sidewall and a second heater element mounted on the other liner sidewall;

a heater thermostat for sensing the temperature in the refrigerated space and connected in circuit with the ambient heater to de-energize the ambient heater when the temperature in the refrigerated space rises above a predetermined refrigerated space temperature;

an ambient thermostat positioned to sense the air temperature outside the refrigerator and connected to the cooling thermostat and the heater thermostat wherein the ambient thermostat energizes the ambient heater through the heater thermostat when the temperature outside the refrigerator falls below a first predetermined temperature, and wherein the ambient thermostat energizes the cooling thermostat when the temperature outside the refrigerator rises above a second predetermined temperature.

15. The refrigerator of claim 14 wherein the ambient thermostat is a 3-way bi-metal thermostat located in the machinery compartment, and wherein the ambient thermostat operates to energize the ambient heater when the ambient temperature falls to approximately 32° F., and operates to de-energize the ambient heater and energize the cooling thermostat when the ambient temperature rises to approximately 48° F.

16. The refrigerator of claim 14 wherein the ambient heater elements comprise a serpentine heater wire mounted to a foil sheet mounted on the outside surface of the liner sidewalls adjacent the bottom of the liner.

17. The refrigerator of claim 14 wherein the evaporator is a serpentine evaporator mounted to the outside rear surface of the liner, the condenser is a static condenser mounted on the rear wall of the cabinet, and the top wall and bottom wall of the cabinet extend beyond the rear wall of the cabinet, and the top wall has a vent formed in the portion of the top wall extending beyond the rear wall for facilitating air flow over the static condenser.

18. The refrigerator of claim 14 wherein the hinged insulated door further includes a beverage container rack mounted on the inside of the door.

* * * * *